(12) United States Patent
Ferlitsch

(10) Patent No.: US 8,334,999 B2
(45) Date of Patent: Dec. 18, 2012

(54) METHOD AND SYSTEM FOR AUGMENTING IMAGING DEVICE WITH NON-NATIVE JOB SETTINGS

(75) Inventor: Andrew Rodney Ferlitsch, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 589 days.

(21) Appl. No.: 12/217,963

(22) Filed: Jul. 10, 2008

(65) Prior Publication Data

US 2010/0007911 A1     Jan. 14, 2010

(51) Int. Cl.
*G06F 3/12* (2006.01)

(52) U.S. Cl. ...... 358/1.15; 358/1.14; 709/205; 709/212; 709/216; 709/228; 715/737; 715/810; 715/813; 719/328

(58) Field of Classification Search .................. 345/762, 345/765, 810; 395/114; 707/3; 709/225, 709/205, 212, 216, 228; 358/1.13, 1.15; 715/737, 810, 813; 719/328
See application file for complete search history.

(56) References Cited

U.S. PATENT DOCUMENTS

| 5,699,494 | A | 12/1997 | Colbert et al. ............... 358/1.15 |
| 7,545,530 | B1* | 6/2009 | Meisner et al. ............... 358/1.15 |
| 7,633,644 | B2* | 12/2009 | Lum et al. .................... 358/1.16 |
| 2003/0011633 | A1 | 1/2003 | Conley et al. ................. 715/762 |
| 2003/0011640 | A1 | 1/2003 | Green et al. .................. 715/810 |
| 2003/0025732 | A1 | 2/2003 | Prichard ....................... 715/765 |
| 2003/0063313 | A1 | 4/2003 | Ito |
| 2005/0149501 | A1 | 7/2005 | Barrett ............................ 707/3 |
| 2006/0077445 | A1* | 4/2006 | Yamamura et al. .......... 358/1.15 |
| 2006/0176507 | A1 | 8/2006 | Kobayashi et al. |
| 2007/0156894 | A1 | 7/2007 | Dees ............................. 709/225 |
| 2007/0165258 | A1* | 7/2007 | Farrell et al. ................. 358/1.13 |
| 2008/0174818 | A1* | 7/2008 | Kanamoto .................... 358/1.15 |

FOREIGN PATENT DOCUMENTS

| JP | 06-296212 | 10/1994 |
| JP | 2001-282470 | 10/2001 |
| JP | 2004-172898 | 6/2004 |
| JP | 2004-259249 | 10/2004 |
| JP | 2006-094178 | 4/2006 |
| WO | WO0198864 | 12/2001 |

* cited by examiner

*Primary Examiner* — Benny Q Tieu
*Assistant Examiner* — Juan Guillermety
(74) *Attorney, Agent, or Firm* — Scot A. Reader

(57) ABSTRACT

A method and system for augmenting an imaging device with non-native job settings without unduly complicating the processing of imaging jobs that utilize only native job settings is disclosed. In one aspect, an imaging device comprises a processor, a user interface communicatively coupled with the processor and a network interface communicatively coupled with the processor, wherein under control of the processor in response to job settings selected on the user interface for an imaging job the imaging device selectively invokes via the network interface an external process to process the imaging job per at least one selected job setting based on a determination of whether at least one selected job setting is non-native to the imaging device.

16 Claims, 5 Drawing Sheets

METHOD AND SYSTEM FOR AUGMENTING IMAGING DEVICE WITH NON-NATIVE JOB SETTINGS

BACKGROUND OF THE INVENTION

The present invention relates to digital imaging and, more particularly, to a method and system for augmenting an imaging device with non-native job settings without unduly complicating processing of imaging jobs that use only native job settings.

Imaging devices, such as documents scanners and multi-function peripheral (MFP) devices, support numerous job settings that are selectable by a user. These job settings allow a user to specify, for example, a desired output format and destination for an imaging job. Oftentimes, an imaging device manufacturer wants to add to the job settings that are supported natively on an imaging device without updating the imaging device firmware. In these cases, the manufacturer may support the additional job settings non-natively using external processes that interoperate with the imaging device.

In one known technique for supporting non-native job settings, an external controlling application transmits to an imaging device a hybrid user interface description that includes native and non-native job settings. The hybrid user interface description is applied to display the native and non-native job settings on the imaging device simultaneously. When a walk-up user selects job settings for an imaging job from the displayed job settings, the selected job settings are transmitted to the external controlling application. The external controlling application interprets the selected job settings and divides them between native and non-native job settings. The native job settings are returned to the imaging device. The imaging device processes the imaging job according to the native job settings and the natively processed image data are transmitted to an external process associated with the external controlling application. The external process then processes the imaging job according to the non-native job settings to generate fully processed image data that is transmitted to the destination.

This known technique has drawbacks, particularly in circumstances where the job settings required for a walk-up imaging job are strictly native. In that case, the hybrid user interface provided by the external controlling application unnecessarily displaces a simpler user interface that is natively supported on the imaging device, and the external controlling application is needlessly injected into the imaging job process flow.

SUMMARY OF THE INVENTION

The present invention, in a basic feature, provides a method and system for augmenting an imaging device with non-native job settings without unduly complicating the processing of imaging jobs that utilize only native job settings.

In one aspect of the invention, an imaging device comprises a processor, a user interface communicatively coupled with the processor and a network interface communicatively coupled with the processor, wherein under control of the processor in response to job settings selected on the user interface for an imaging job the imaging device selectively invokes via the network interface an external process to process the imaging job in accordance with at least one selected job setting based on a determination of whether at least one selected job setting is non-native to the imaging device.

In some embodiments, in response to determining that no selected job setting is non-native to the imaging device, the imaging device processes the imaging job without invoking the external process.

In some embodiments, in response to determining that no selected job setting is non-native to the imaging device, the imaging device under control of the processor processes the imaging job in accordance with at least one selected job setting that is native to the imaging device to produce natively processed image data and transmits via the network interface to a destination specified in at least one selected job setting the natively processed image data.

In some embodiments, in response to determining that at least one selected job setting is non-native to the imaging device, the imaging device invokes the external process.

In some embodiments, in response to determining that at least one selected job setting is non-native to the imaging device, the imaging device under control of the processor processes the imaging job in accordance with at least one selected job setting that is native to the imaging device to produce natively processed image data and transmits via the network interface to the external process the natively processed image data.

In some embodiments, in response to determining that at least one selected job setting is non-native to the imaging device, the imaging device under control of the processor generates a first metadata packet having at least one selected job setting that is native to the imaging device and transmits via the network interface to the external process the first metadata packet.

In some embodiments, in response to determining that at least one selected job setting is non-native to the imaging device, the imaging device under control of the processor generates a second metadata packet having at least one selected job setting that is non-native to the imaging device and transmits via the network interface to the external process the second metadata packet.

In some embodiments, in response to determining that at least one selected job setting is non-native to the imaging device, the imaging device under control of the processor processes the imaging job in accordance with at least one selected job setting that is native to the imaging device to produce natively processed image data and transmits via the network interface to the external process the natively processed image data, a first metadata packet having at least one selected job setting that is native to the imaging device and second metadata packet having at least one selected job setting that is non-native to the imaging device.

In some embodiments, the first metadata packet specifies a destination and a delivery method for the imaging job.

In another aspect of the invention, an imaging device comprises a processor, a user interface communicatively coupled with the processor and a network interface communicatively coupled with the processor, wherein under control of the processor native job settings selectable for an imaging job are displayed on the user interface and in response to an input on the user interface indicative of a request to review additional job settings selectable for the imaging job the imaging device requests via the network interface an external assisting application to provide a user interface description identifying non-native job settings selectable for the imaging job in response to which the imaging device receives the user interface description via the network interface and displays on the user interface the non-native job settings.

In another aspect of the invention, a method for assisting an imaging device with imaging job processing comprises the steps of receiving from an imaging device natively processed image data for an imaging job, receiving from the imaging device a first metadata packet having native job settings for the imaging job, receiving from the imaging device a second metadata packet having non-native job settings for the imaging job, processing the natively processed image data in accordance with at least one non-native job setting specified in the second metadata packet to produce fully processed image data, determining a destination for the fully processed image data from the first metadata packet and transmitting the fully processed image data to the destination.

In some embodiments, the method further comprises the steps of determining from the first metadata packet a delivery method for the fully processed image data and transmitting to the destination using the delivery method the fully processed image data.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
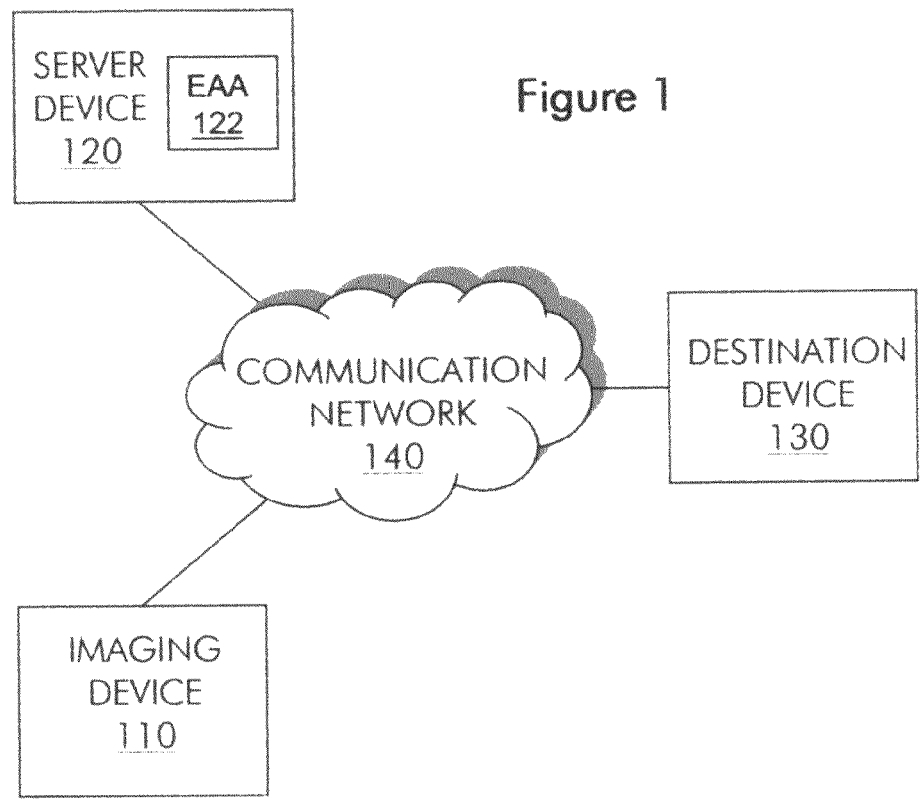
FIG. 1 shows a communication system.

FIG. 1 shows a communication system in some embodiments of the invention. The communication system includes an imaging device 110, server device 120 and destination device 130, all of which are communicatively coupled via communication network 140.

Figure 2:
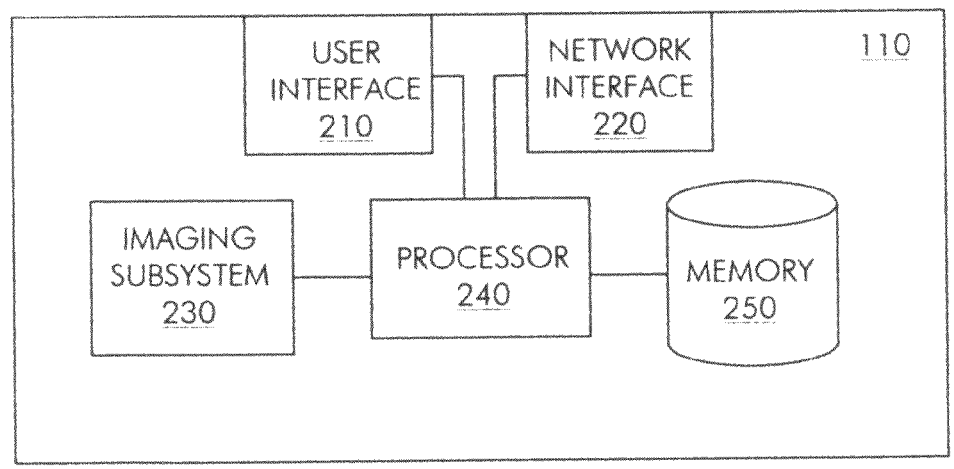
FIG. 2 shows an imaging device.

Imaging device 110 is a network capable electronic device having a walk-up imaging capability. Imaging device 110 may be, for example, a document scanner, copier, fax machine, printer, conversion device, publishing device, MFP device, electronic whiteboard, digital camera, audio/video recorder/player, cable set-top box, digital display device, media duplication device, x-ray machine, magnetic resonance imaging (MRI) device or computerized axial tomography (CAT) scan device. More generally, imaging device 110 can be any device that is capable of producing and transmitting digital image data, or a byproduct thereof. Turning to FIG. 2, imaging device 110 is shown to have a user interface 210. User interface 210 has a touch panel for accepting inputs from walk-up users and an output mechanism, such as a liquid crystal display (LCD) or light emitting diode (LED) display, for displaying outputs to walk-up users. User interface 210 may have additional input mechanisms, such as a keyboard or keypad. Imaging device 110 also has a network interface 220 that communicatively couples imaging device 110 with communication network 140. Network interface 220 may be a Small Computer System Interface (SCSI), a Universal Serial Bus (USB) port, a parallel port, or a wired or wireless data communication interface, such as wired Ethernet interface, wireless local area network (Wi-Fi) interface or wireless metropolitan area network (WiMAX) interface. Internal to imaging device 110, user interface 210 and network interface 220 are communicatively coupled with a processor 240, which is also communicatively coupled with an imaging subsystem 230 and a memory 250. Imaging subsystem 230 includes imaging logic and a mechanical section for performing imaging functions, such as document scanning and/or other form of image capture, image synthesis or extraction of a byproduct from image data. For example, imaging logic may have a line image sensor mounted on a movable carriage for optically scanning under the control of imaging logic a hardcopy document manually placed or automatically fed to an exposure glass, after which the image data generated from the document is stored in memory 250 under control of processor 240. In another example, the imaging logic may capture a still frame from a video stream, which is operable from a cable set-top box. Memory 250 includes one or more random access memory (RAM) elements and one or more read-only memory (ROM) elements. Processor 240 executes software installed in memory 250 to carry-out operations on imaging device 110, including processing of imaging jobs initiated by walk-up users and selectively invoking an external assisting application (EAA) 122 on server device 120 to facilitate processing of walk-up imaging jobs.

Server device 120 is a network capable electronic device that hosts EAA 122. EAA 122 is an external process (i.e. external to imaging device 110) that is executable by a processor on server device 120 to assist imaging device 110 with processing of imaging jobs initiated on imaging device 110 when invoked by imaging device 110. EAA 122 may be an exposed web service or a computer program from an external source that is running as a guest program on imaging device 110, such as a Java application running on a virtual Java machine.

Destination device 130 is a network capable electronic device that can provide and/or host a destination for imaging jobs initiated on imaging device 110. An imaging job destination may be a physical or virtual destination represented by, for example, an Internet Protocol (IP) address, email address, network folder, cell phone number or website Uniform Resource Locator (URL).

Communication network 140 is a data communication network. In some embodiments, communication network 140 includes dedicated physical connections, such as SCSI, USB and/or parallel port connections. In other embodiments, communication network 140 is a wired or wireless network that includes an arbitrary number of multiplexing nodes, such as wired Ethernet switches, Wi-Fi or WiMax access points, and/or IP routers, that execute data communication protocols and store and forward data traffic between devices 110, 120, 130. In other embodiments, communication network 140 is an optical network in which fiber optics or other optical technologies utilize a waveguide to guide an optical beam between devices 110, 120, 130. In some embodiments, communication network 140 traverses the Internet.

Figure 3:
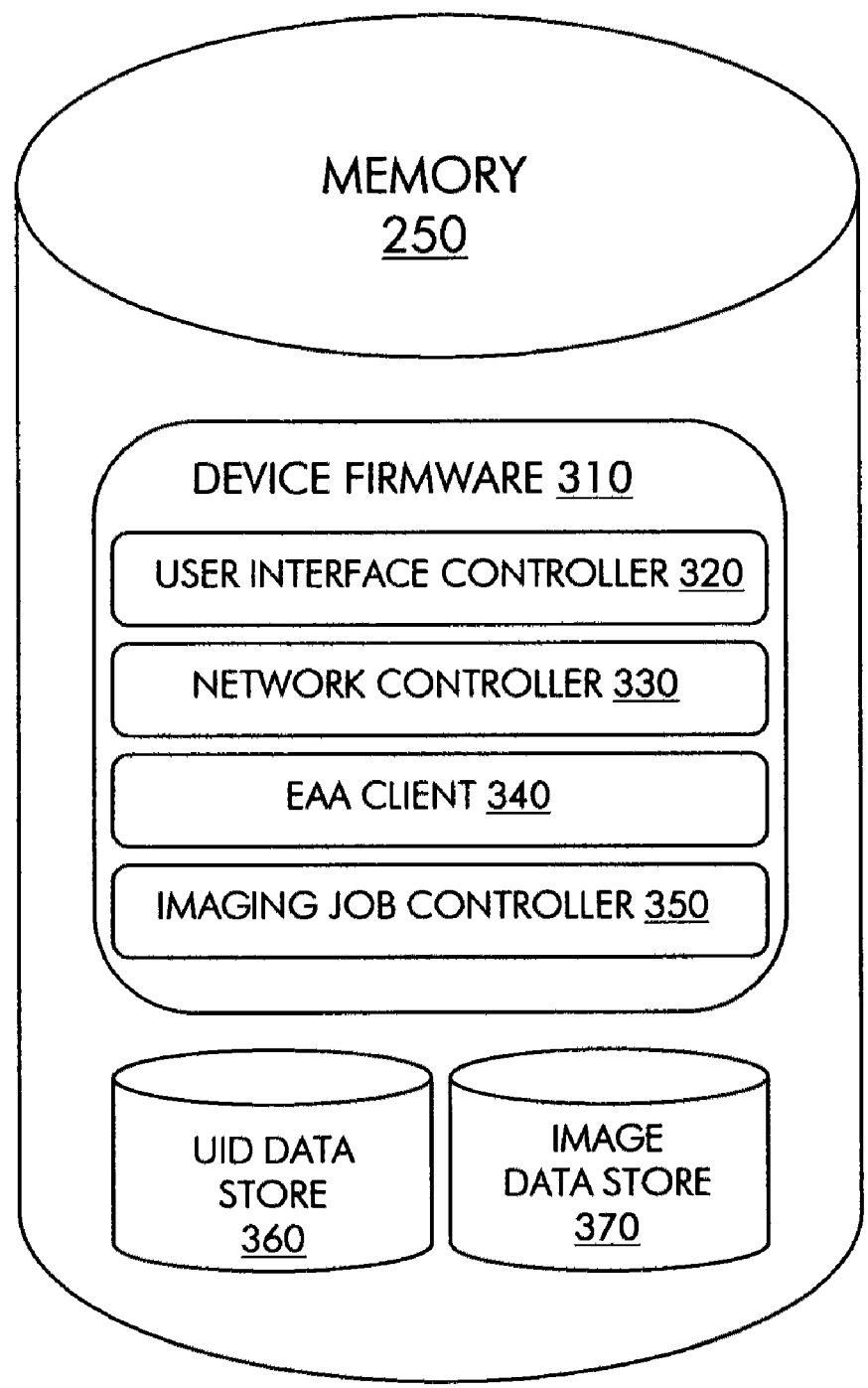
FIG. 3 shows firmware executable on the imaging device of FIG. 2.

FIG. 3 shows device firmware 310 that is executable on imaging device 110. Firmware 310 includes several internal processes (i.e. internal to imaging device 110). User interface controller 320 manages interactions between imaging device 110 and walk-up users via user interface 210. A walk-up user initiates an imaging job on imaging device 110 via inputs on user interface 210. To facilitate initiation of an imaging job by a walk-up user, user interface controller 320 renders on user interface 210 touch screens having various native and non-native job settings for imaging jobs that are selectable by the walk-up user to meet user requirements for an imaging job.

Native and non-native job settings may include, for example, destination settings (e.g. workstation, email, network folder, Net Meeting, cell phone, website), delivery protocol settings [e.g. File Transfer Protocol (FTP), email, Hypertext Transfer Protocol (HTTP), instant messaging (IM)], output format and encoding settings [e.g. Portable Document Format (PDF), Microsoft Word, plain text document formats, Tagged Image File Format (TIFF), Joint Photographic Experts Group (JPEG), Portable Network Graphics (PNG), Graphics Interchange Format (GIF), Bitmap File Format (BMP), Windows Media Photo (WMP), Exchangeable Image File Format (EXIF), Scalable Vector Graphics (SVG), G3 compression, G4 compression, Lempel Ziv Welch (LZW) compression, Public Key Infrastructure (PKI) encryption], document marking settings (e.g. watermarks, Bates stamping), image enhancement settings, optical character recognition settings, indexing and archiving settings, and 2-D/3-D image synthesis from an image composition.

Network controller 330 manages interactions between imaging device 110 and other network devices via network interface 220. Network controller 330 establishes and manages connectivity to communication network 140 via network interface 220. When network controller 330 receives an outbound communication, network controller 330 packetizes the communication per communication protocols operative in communication network 140 and transmits the packetized communication via network interface 220. When network controller 330 receives an inbound communication via communication network 140, network controller 330 parses the packet and routes the communication internally.

EAA client 340 manages interactions with EAA 122. EAA client 340 may be a web services client.

Imaging job controller 350 performs native processing on imaging jobs initiated by walk-up users on user interface 210. Imaging job controller 350 converts the content, such as a hardcopy document resident on exposure glass of imaging device 110 for optical scanning by imaging subsystem 230, into image data, then processes the image data in accordance with native job settings that have been selected by the walk-up user and then either transmits the image data to a destination device (e.g. 130) specified in the native job settings or invokes EAA client 340 which in turn invokes EAA 122 for further processing of the natively processed image data.

User interface description (UID) data 360 stores descriptions of touch screens that are displayable on user interface 210. UID data 360 includes a native UID that is in a format native to imaging device 110 and has native job settings selectable by a walk-up user for an imaging job. UID data 360 may also include a non-native UID that is in a format non-native to imaging device 110 and has non-native job settings selectable by a walk-up user for an imaging job. In some embodiments, the non-native UID is in a markup language, such as eXtensible Markup Language (XML) or XML User Interface Language (XUL). For example, where imaging device 110 is a document scanner and the non-native job settings include an output format selection and a selection of whether to mark documents with a Bates stamp, a non-native UID may read as follows:

```
<action type="HostEmulationUI">
    <settings type="Scanner">
        <setting name="Format" type="List">
            <selection>MS-Word</selection>
            <selection>Plain Text</selection>
            <selection>Full-Text Adobe</selection>
```

-continued

```
        </settings>
        <setting name="Bates Stamp" type="CheckBox"/>
    </settings>
</action>
```

In other embodiments, the non-native UID may be in an alternative format, such as HTTP, Direct Internet Message Encapsulation (DIME), eXtensible Application Markup Language (XAML), Multimedia Message Service (MMS) or a proprietary format. Moreover, in some embodiments, the non-native UID is statically configured on EAA 122, whereas in other embodiments the non-native UID is dynamically determined by EAA 122 by discovering the capabilities of imaging device 110 and filtering duplicated capabilities from a full host emulation user interface. Furthermore, in some embodiments, the non-native UID is transmitted by EAA 122 to imaging device 110 and pre-stored in UID data store 360 in an advertisement, discovery or registration process, while in other embodiments the non-native UID is transmitted by EAA 122 to imaging device 110 and dynamically stored in UID data store 360 upon request from EAA client 340 for additional job settings.

Image data store 370 stores image data that has been captured by imaging subsystem 230, for example, by optically scanning under the control of imaging logic of imaging subsystem 230 a hardcopy document resident on exposure glass. Captured image data may be stored in image data store 370 in its original form or as modified by processing by imaging job controller 350 in accordance with native job settings selected by a walk-up user.

Figure 4:
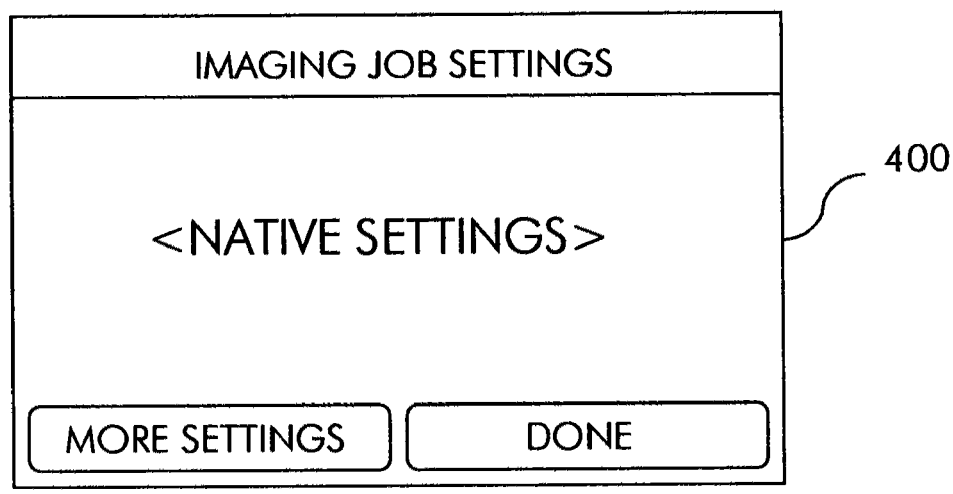
FIG. 4 shows a touch screen displaying selectable native job settings.
Figure 5:
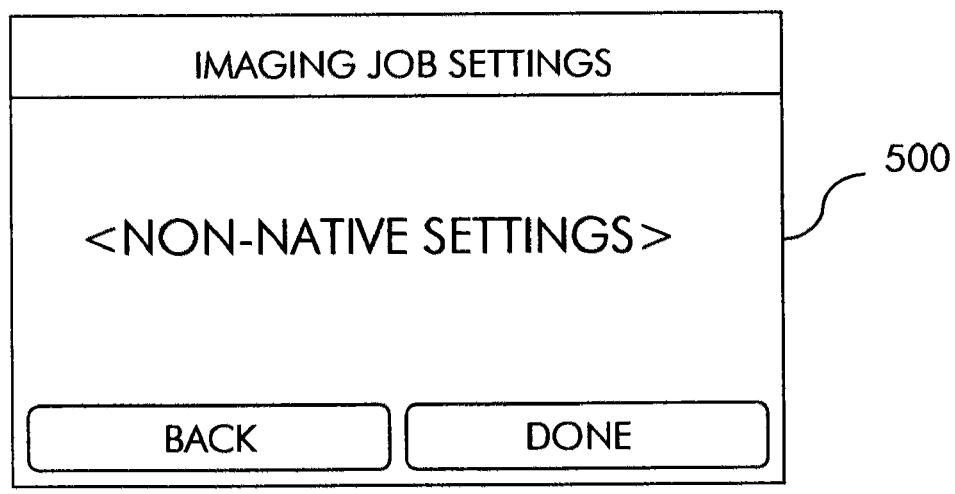
FIG. 5 shows a touch screen displaying selectable non-native job settings.
Figure 6:
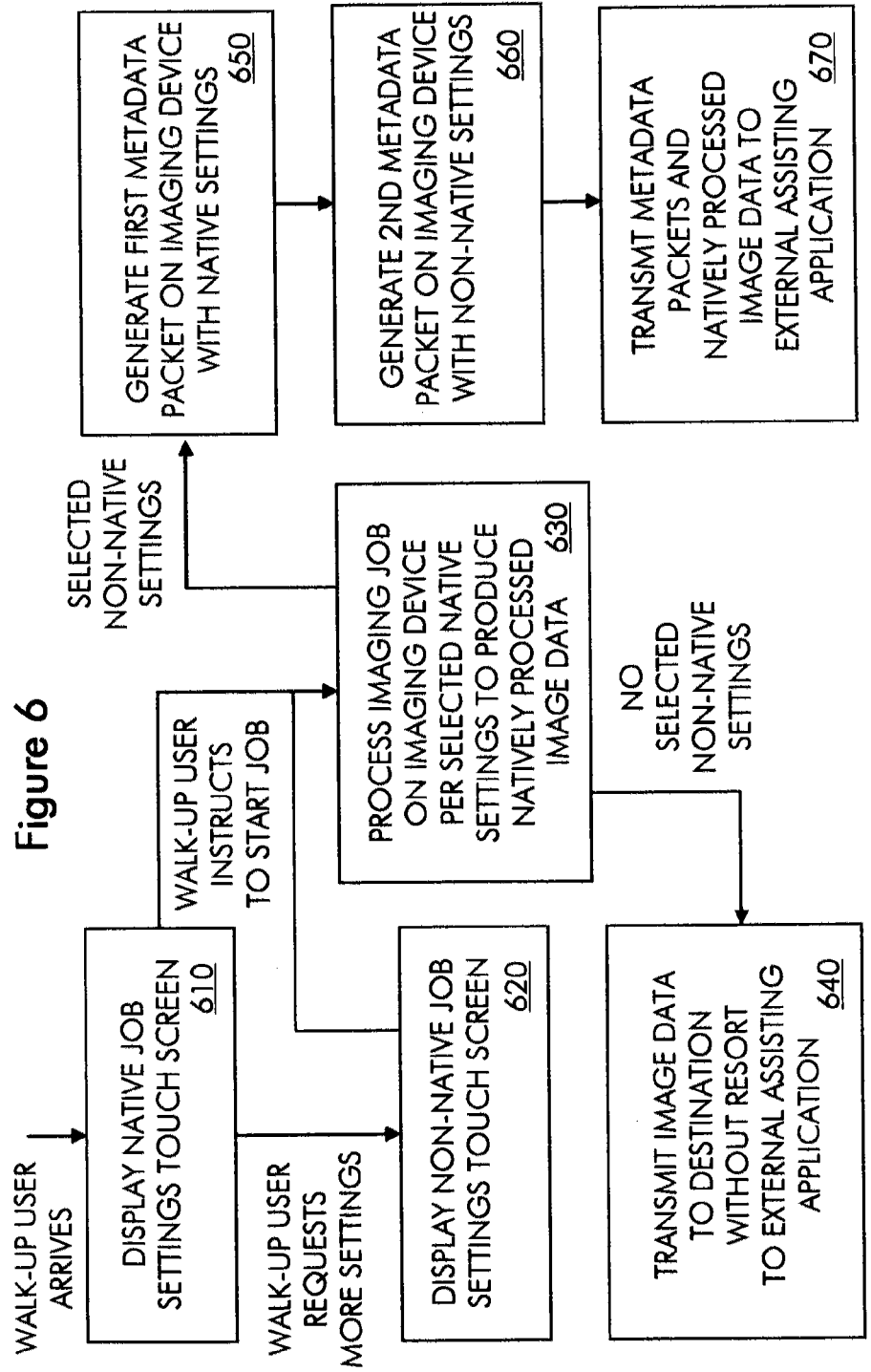
FIG. 6 shows method steps performed by an imaging device in some embodiments of the invention.

Turning now to FIGS. 4 and 5 in conjunction with FIG. 6, method steps performed by imaging device 110 in some embodiments of the invention are described. A walk-up user arrives at imaging device 110 and places a hardcopy document on the exposure glass of imaging device 110, at which time a touch screen 400 having job settings that are native to imaging device 110 is displayed (610). The content of touch screen 400 is defined by the native UID stored in UID data store 360 and retrieved by user interface controller 320. The walk-up user selects native job settings on touch screen 400 that comport with the user's requirements for the imaging job and then either instructs imaging device 110 to start the imaging job by selecting "DONE" or requests additional job settings by selecting "MORE SETTINGS".

If the walk-up user selects "DONE", user interface controller 320 invokes imaging job controller 350. Imaging job controller 350 processes the captured image data in accordance with the selected native job settings to produce natively processed image data (630). Since no non-native job settings were reviewed or selected, imaging job controller 350 transmits the natively processed image data to a destination (e.g. 130) specified in the selected native job settings without invoking EAA 122 (640).

If, on the other hand, the walk-up user selects "MORE SETTINGS", user interface controller 320 invokes EAA client 340. EAA client 340 transmits to EAA 122 via network interface 220 a request for additional job settings. In response to such a request, EAA 122 returns to EAA client 340 a non-native UID having job settings that are non-native to imaging device 110. The non-native UID is stored in UID data store 360 and displayed to the walk-up user on user interface 210 as touch screen 500 (620). The walk-up user selects any non-native job settings on touch screen 500 that comport with the user's requirements for the imaging job and then either instructs to start the imaging job by selecting "DONE" or requests to return to the previous touch screen 400 by selecting "BACK".

If the walk-up user selects "DONE", user interface controller 320 invokes imaging job controller 350. Imaging job controller 350 processes the captured image data in accordance with the selected native job settings to produce natively processed image data (630). Then, if no non-native job settings were selected, imaging job controller 350 transmits the natively processed image data to a destination (e.g. 130) specified in the selected native job settings without invoking EA 122 (640). However, if at least one non-native job setting was selected, imaging job controller 350 notifies EAA client 340 and EAA client 340 invokes EAA 122 for assistance in processing the image data in accordance with the one or more selected non-native job settings. More particularly, EAA client 340 generates a first metadata packet having the selected native job settings (650), generates a second metadata packet having the selected non-native job settings (660), and transmits the first and second metadata packets and the natively processed imaging data to EAA 122 (670).

Figure 7:
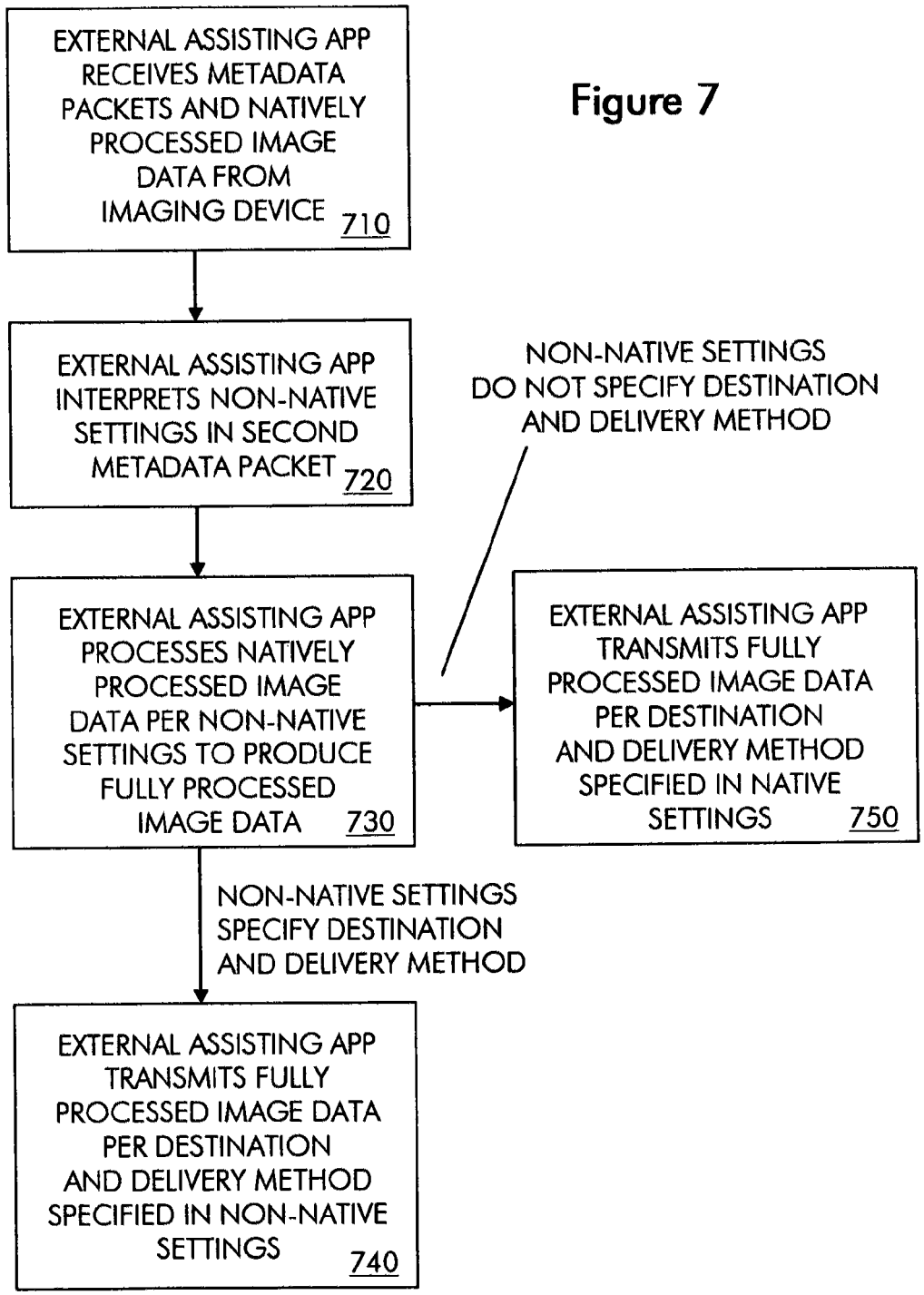
FIG. 7 shows method steps performed by an external assisting application in some embodiments of the invention.

FIG. 7 shows method steps performed by EAA 122 in response to receiving the first and second metadata packets and natively processed image data from imaging device 110. Upon such receipt (710), EAA 122 interprets the selected non-native job settings in the second metadata packet (720) and processes the natively processed image data in accordance with the selected non-native job settings to produce fully processed image data (730). EAA 122 then transmits the fully processed image data to a destination (e.g. 130) using the delivery method specified in the selected non-native job settings (740), or if the non-native job settings do not specify a destination and delivery method then transmits the fully processed image data to a destination and using the delivery method specified in the selected native job settings (750).

In other embodiments, EAA client 340 transmits the metadata packets and the natively processed image data to an external process designated by EAA 122, rather than EAA 122 itself, and the designated external process processes the natively processed image data in accordance with the selected non-native settings to produce fully processed image data and delivers the fully processed image data to a specified destination via a specified delivery method.

In still other embodiments, EAA client 340 transmits the metadata packets and the natively processed image data to EAA 122, whereupon EAA 122 routes the metadata packets and natively processed image data to an external process, whereupon the recipient external process processes the natively processed image data in accordance with the selected non-native settings to produce fully processed image data and delivers the fully processed image data to a specified destination via a specified delivery method.

In other embodiments, native and non-native job settings that are selectable by a walk-up user may be displayed simultaneously on the user interface, either in separate sections or in an intermixed arrangement.

In still other embodiments, the non-native job settings that are selectable by a walk-up user may be sourced from multiple external processes.

It will be appreciated, therefore, by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A method for augmenting an imaging device with non-native job settings, comprising the steps of:
    displaying as output on the imaging device selectable native job settings for an imaging job;
    receiving as input on the imaging device one or more selected native job settings for the imaging job from the selectable native job settings;
    selectively receiving as input on the imaging device a request to review additional selectable job settings for the imaging job that are independent of the selectable native job settings;
    selectively displaying as output on the imaging device selectable non-native job settings for the imaging job that are independent of the selectable native job settings based on whether the request is received, wherein the selectable non-native job settings include at least one setting in each of at least three settings categories selected from the group consisting of image destination, image delivery protocol, image file format, image marking, image enhancement, optical character recognition and image archiving;
    selectively receiving as input on the imaging device one or more selected non-native job settings for the imaging job from the selectable non-native job settings;
    processing by the imaging device the imaging job according to the selected native job settings whereby natively processed imaging data for the imaging job are produced; and
    selectively transmitting from the imaging device to an external assisting application the natively processed imaging data based on whether the selected non-native job settings are received.

2. The method of claim 1, wherein if the selected non-native job settings are not received the imaging device inhibits transmission to the external assisting application of the natively processed imaging data.

3. The method of claim 1, wherein if the selected non-native job settings are received the imaging device transmits to the external assisting application the natively processed imaging data.

4. The method of claim 3, wherein if the selected non-native job settings are received the imaging device further transmits to the external assisting application the selected non-native job settings and the selected native job settings.

5. The method of claim 4, wherein the selected non-native job settings are transmitted in a first metadata packet and the selected native job settings are transmitted in a second metadata packet.

6. The method of claim 1, further comprising the step of selectively transmitting the natively processed imaging data from the imaging device to a destination specified in the selected native job settings based on whether the selected non-native job settings are received.

7. The method of claim 6, wherein if the selected non-native job settings are received the imaging device inhibits transmission of the natively processed imaging data to the destination.

8. The method of claim 6, wherein if the selected non-native job settings are not received the imaging device transmits the natively processed imaging data to the destination.

9. An imaging device, comprising:
    a processor;
    a user interface communicatively coupled with the processor; and
    a network interface communicatively coupled with the processor, wherein the imaging device displays on the user interface selectable native job settings for an imaging job, receives on the user interface one or more selected native job settings for the imaging job from the selectable native job settings, selectively receives on the user interface a request to review additional selectable job settings for the imaging job that are independent of the selectable native job settings, selectively displays on the user interface selectable non-native job settings for the imaging job that are independent of the selectable native job settings based on whether the request is received, wherein the selectable non-native job settings include at least one setting in each of at least three settings categories selected from the group consisting of image destination, image delivery protocol, image file format, image marking, image enhancement, optical character recognition and image archiving, selectively receives on the user interface one or more selected non-native job settings for the imaging job from the selectable non-native job settings, processes under control of the processor the imaging job according to the selected native job settings whereby natively processed imaging data for the imaging job are produced and selectively transmits to an external assisting application via the network interface the natively processed imaging data based on whether the selected non-native job settings are received.

10. The imaging device of claim 9, wherein if the selected non-native job settings are not received the imaging device under control of the processor inhibits transmission to the external assisting application of the natively processed imaging data.

11. The imaging device of claim 9, wherein if the selected non-native job settings are received the imaging device transmits to the external assisting application via the network interface the natively processed imaging data.

12. The imaging device of claim 11, wherein if the selected non-native job settings are received the imaging device further transmits to the external assisting application via the network interface the selected non-native job settings and the selected native job settings.

13. The imaging device of claim 12, wherein the selected non-native job settings are transmitted in a first metadata packet and the selected native job settings are transmitted in a second metadata packet.

14. The imaging device of claim 9, wherein the imaging device further selectively transmits the natively processed imaging data via the network interface to a destination specified in the selected native job settings based on whether the selected non-native job settings are received.

15. The imaging device of claim 14, wherein if the selected non-native job settings are received the imaging device under control of the processor inhibits transmission of the natively processed imaging data to the destination.

16. The imaging device of claim 14, wherein if the selected non-native job settings are not received the imaging device transmits the natively processed imaging data to the destination via the network interface.

\* \* \* \* \*